United States Patent [19]
Davis

[11] Patent Number: 5,368,145
[45] Date of Patent: Nov. 29, 1994

[54] NONSYNCHRONIZED POSITIVE CLUTCH STRUCTURE

[75] Inventor: Alan R. Davis, Plainwell, Mich.

[73] Assignee: Eaton Corporation, Cleveland, Ohio

[21] Appl. No.: 18,124

[22] Filed: Feb. 16, 1993

[51] Int. Cl.$^5$ ............................................. F16D 11/14
[52] U.S. Cl. .................... 192/67 R; 192/108; 74/332
[58] Field of Search ............... 192/67 R, 108; 74/332

[56] References Cited

U.S. PATENT DOCUMENTS

| | | | |
|---|---|---|---|
| 3,105,395 | 10/1963 | Perkins | 74/745 |
| 3,265,173 | 8/1966 | Russell | 192/67 R |
| 3,335,616 | 8/1967 | Perkins | 74/331 |
| 3,500,695 | 3/1970 | Keiser | 74/331 |
| 3,709,343 | 1/1973 | Sigg | 192/67 R |
| 3,799,002 | 3/1974 | Richards | 74/745 |
| 4,388,838 | 6/1983 | Richards et al. | 74/331 |
| 4,619,150 | 10/1986 | Wiggenhauser | 74/332 |
| 5,000,060 | 3/1991 | Reynolds et al. | 74/745 |
| 5,052,535 | 10/1991 | Vandervoort et al. | 192/67 R |

FOREIGN PATENT DOCUMENTS 2207557 6/1974 France .
2260294 6/1973 Germany .

Primary Examiner—Richard M. Lorence
Attorney, Agent, or Firm—Howard D. Gordon

[57] ABSTRACT

A nonsynchronized positive clutch system (200) is provided for selectively rotationally coupling and decoupling a first (46) and a second (42) independently rotatable members. The clutch system includes clutch members (50, 42A) each carrying a number (N) of interengagable clutch teeth (208, 210) which is maximized in view of pitch diameter (214), clutch backlash (216) and durability considerations. By increasing the number of clutch teeth, relative to the prior art (200P), smoother shifting and/or reduced risk of missed engagements is obtained.

18 Claims, 5 Drawing Sheets

NONSYNCHRONIZED POSITIVE CLUTCH STRUCTURE

BACKGROUND OF THE INVENTION

1. Field of the Invention

This invention relates to an improved structure for nonsynchronized positive clutches of the type comprising a first clutch member fixed for rotation, with a degree of rotational freedom, to a first rotatable device and selectively engagable with a second clutch member rotatable with a second rotatable device. The first clutch member is typically splined to a shaft for rotation therewith and axial movement relative thereto and is selectively axially movable relative to a gear carrying the second clutch member for selectively engaging and disengaging the positive clutch to selectively rotationally couple and decouple the gear to and from the shaft.

More particularly, the present invention relates to an axially engagable and disengagable nonsynchronized positive clutch structure wherein the number of interengagable clutch teeth carried by the clutch members is considerably greater (preferably at least fifty percent greater, more preferably at least one hundred percent greater) than the number of clutch teeth utilized with the corresponding nonsynchronized positive clutch structures of the prior art.

2. Description of the Prior Art

Nonsynchronized positive clutch systems for selectively rotationally coupling and decoupling a first rotatable device, such as a gear, to a second rotatable device, such as a shaft, are, of course, well known in the prior art. Change gear transmissions utilizing such positive clutches, without synchronizing mechanisms to minimize the cost, size and/or complexity thereof, are well known in the prior art as may be seen by reference to U.S. Pat. Nos. 2,951,395; 3,105,395; 3,335,616; 3,500,695; 3,799,002; 4,388,838; 4,754,665; 5,000,060 and 5,052,535, the disclosures of which are hereby incorporated by reference.

The clutch members of nonsynchronized positive clutch systems are, preferably, provided with clutch teeth having a leading edge structure which, during a clutch engagement, will tend to cause the clutch members to ratchet rather than engage if the relative rotational speeds thereof exceed a predetermined value. An example of such a clutch tooth structure may be seen by reference to U.S. Pat. No. 3,265,173, the disclosure of which is hereby incorporated by reference. As is known, for a given engagement force, the maximum allowable relative rotational speed at which the positive clutches will properly engage (i.e. sufficient clutch tooth penetration will occur) is a directly proportional function of the total effective backlash in the clutch system. The maximum allowable asynchronous conditions at which clutch engagement is allowed is selected in view of the most harsh clutch engagement which is acceptable.

While change gear transmissions utilizing the nonsynchronized positive clutch structures of the prior art, especially for heavy duty vehicles (MVMA Class 6 and larger), are very commercially successful, such transmissions and clutch structures are not totally satisfactory as the prior art clutches typically utilize a relatively small number of clutch teeth, typically 18 to 20 on the clutch members, which tends to result in the vehicle operator applying a larger force to cause engagement which will result in harsher and further out of synchronous clutch engagements than is desirable.

Certain prior art manually shifted nonsynchronized transmissions, such as Assignee of the present invention Eaton Corporation's Model T-11607 transmissions, have had one or more relatively larger diameter nonsynchronized positive clutches having a relatively large number of clutch teeth (30 clutch teeth per clutch member), however, no attempt has been made to maximize the number of clutch teeth utilized with such clutches.

SUMMARY OF THE INVENTION

In accordance with the present invention, the drawbacks of the prior art are minimized by the provision of a nonsynchronized positive clutch structure which will allow smoother and closer to synchronous clutch engagements, without increased risk of missed shifts, than were obtained with the corresponding clutch structures of the prior art.

The above is accomplished by increasing the number of interengaging clutch teeth carried by each of the clutch members by at least fifty percent (50%), preferably by about one hundred percent (100%) or more, from the number of clutch teeth normally utilized on corresponding nonsynchronized positive clutch members. By way of example, in heavy duty truck transmissions manufactured by the Assignee of this invention, Eaton Corporation, a typical prior art nonsynchronized jaw clutch having about a three inch pitch diameter will utilize eighteen clutch teeth on each clutch member while corresponding (substantially the same pitch diameter and backlash) jaw clutches produced according to the present invention utilize about thirty-nine or forty clutch teeth on each clutch member.

Applicant has found that heavy duty manually shifted transmissions provided with nonsynchronized positive clutch assemblies according to the present invention tend to be shifted in a noticeably smoother manner. In particular, the advantages of the present invention are maximized by providing about the maximum number of clutch teeth on each clutch member as determined in consideration of pitch diameter, selected backlash and minimum clutch tooth thickness required for strength.

Accordingly, it is an object of the present invention to provide an improved nonsynchronized positive clutch for manually and/or automatically shifted heavy duty transmissions allowing the operator to achieve smoother clutch engagement without undue risk of missed shifts.

This and other objects and advantages of the present invention may be appreciated by reference to the attached drawings taken in connection with the description of the preferred embodiment.

BRIEF DESCRIPTION OF THE DRAWINGS

FIG. 3 is an enlarged sectional view of a prior an positive clutch system as would be used with the transmission of FIG. 1.

DESCRIPTION OF THE PREFERRED EMBODIMENT

Figure 1:
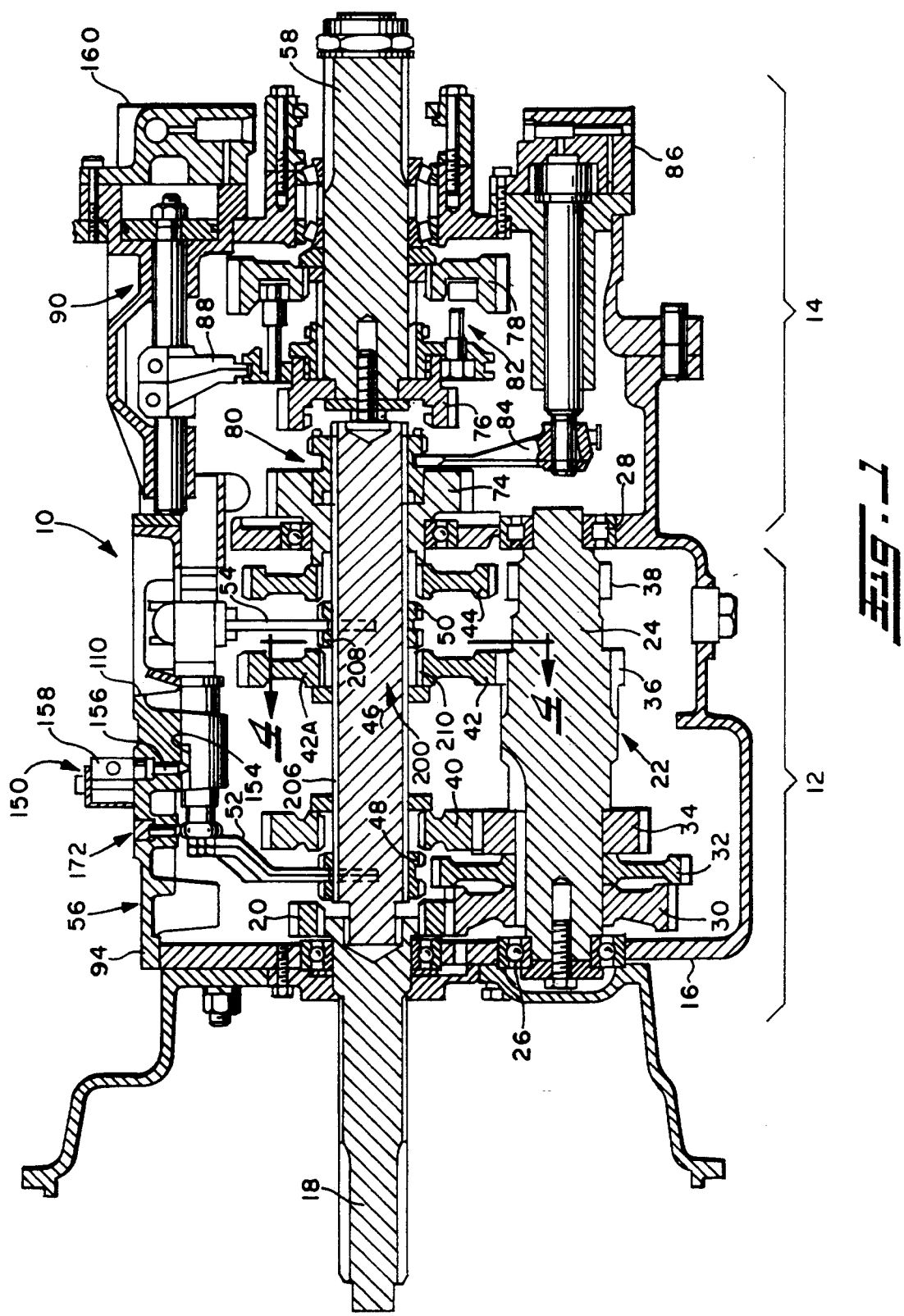
FIG. 1 is a plan view, in section, of the compound transmission of the present invention.

Certain terminology will be used in the following description for convenience only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in the vehicle, being respectfully to the left and right sides of the transmission as illustrated in FIG. 1. The words "inwardly" and "outwardly" will refer to directions toward and away from, respectively, the geometric center of the device and designated parts thereof. Said terminology includes the words above specifically mentioned, derivatives thereof and words of similar import.

The term "compound transmission" is used to designate a change speed or change gear transmission having a main transmission section and an auxiliary drive train unit, such as an auxiliary transmission section, connected in series whereby the selected gear reduction in the main transmission section may be compounded by further selected gear reduction in the auxiliary transmission section. It is understood, that while the preferred embodiment of the present invention utilizes an auxiliary transmission section connected in series with the main transmission section, the invention is equally applicable to simple transmissions connected in series with shiftable multispeed devices such as multispeed transfer cases and/or multispeed rear drive axle systems. The term "upshift" as used herein shall mean the shifting from a lower speed gear ratio to a higher speed gear ratio and the term "downshift" as used herein shall mean the shifting from a higher speed gear ratio to a lower speed gear ratio. The terms "low speed gear" or "low gear" as used herein shall designate a gear utilized for relatively lower forward speed operation in a transmission, i.e., a set of gears having a higher ratio of reduction of output shaft speed relative to the speed of the input shaft.

Referring now to FIG. 1, the compound transmission 10 is illustrated. Transmission 10 comprises a main transmission section 12 connected in series with an auxiliary transmission section 14 having both range and splitter type gearing. Typically, transmission 10 is housed within a single multipiece housing 16 and includes an input shaft 18 driven by a prime mover such as a diesel engine (not shown) through a selectively disengaged, normally engaged, friction master clutch (not shown).

In the main transmission section 12, the input shaft 18 carries an input gear 20 for driving at least one countershaft assembly 22. Preferably, as is well known in the prior art and as is illustrated in above-mentioned U.S. Pat. Nos. 3,105,395 and 3,335,616 input gear 20 simultaneously drives a plurality of substantially identical mainsection countershaft assemblies at substantially identical rotational speeds. Each of the mainsection countershaft assemblies comprises a mainsection countershaft 24 supported by bearings 26 and 28 in housing 16 and is provided with mainsection countershaft gears 30, 32, 34, 36 and 38 fixed thereto. A plurality of mainsection drive or mainshaft gears 40, 42 and 44 surround the transmission mainshaft 46 and are selectively clutchable, one at a time, to the mainshaft 46 for rotation therewith by sliding clutch collars 48 and 50 as is well known in the art. Clutch collar 48 may also be utilized to clutch input gear 20 to the mainshaft 46 to provide a direct drive relationship between the input shaft 18 and the mainshaft 46. Preferably, each of the mainsection mainshaft gears encircles the mainshaft 46 and is in continuous meshing engagement with and is floatingly supported by the associated countershaft gear groups, which mounting means and special advantages resulting therefrom are explained in greater detail in above-mentioned U.S. Pat. Nos. 3,105,395 and 3,335,616. Typically, clutch collars 48 and 50 are axially positioned by means of shift forks or yokes 52 and 54, respectively, associated with a shift bar housing assembly 56 to be described in greater detail below. Clutch collars 48 and 50 are, in the preferred embodiment, of the well known non-synchronized double acting jaw clutch type.

Main section mainshaft gear 44 is the reverse gear and is in continuous meshing engagement with countershaft gears 38 by means of conventional intermediate idler gears (not shown). Main section countershaft gear 32 is provided for powering power takeoff devices and the like. Jaw clutches 48 and 50 are three-position clutches in that they may be positioned in a centered axially nondisplaced, nonengaged position as illustrated or in a fully rightwardly engaged or fully leftwardly engaged position.

Auxiliary transmission section 14 is connected in series with main transmission section 12 and is of the three-layer, four speed combined splitter/range type as illustrated in above-mentioned U.S. Pat. No. 4,754,665. Mainshaft 46 extends into the auxiliary section 14 and is journalled in the inward end of the output shaft 58 which extends from the rearward end of the transmission.

Auxiliary transmission section 14 includes, in the preferred embodiment thereof, a plurality of substantially identical auxiliary countershaft assemblies (not shown) each comprising an auxiliary countershaft supported by beatings in housing 16 and carrying three auxiliary section countershaft gears fixed for rotation therewith and constantly meshed with splitter gear 74, splitter/range gear 76 or range gear 78.

A sliding two-position jaw clutch collar 80 is utilized to selectively couple either the splitter gear 74 or the splitter/range gear 76 to the mainshaft 46 while a two-position synchronized clutch assembly 82 utilized to selectively couple the splitter/range gear 76 or the range gear 78 to the output shaft 58. The structure and function of double-acting jaw clutch collar 80 is substantially identical to the structure and function of the sliding clutch collars 48 and 50 utilized in the main transmission section 12 and the function of double-acting synchronized clutch assembly 82 is substantially identical to the structure and function of prior art double-acting synchronized clutch assembly, examples of which may be seen by reference to U.S. Pat. Nos. 4,462,489; 4,125,179 and 2,667,955 the disclosures of all of which are hereby incorporated by reference. The synchronized clutch assembly 82 illustrated is of the pin-type described in above-mentioned U.S. Patent No. 4,462,489.

The splitter jaw clutch 80 is a two-position clutch assembly which may be selectively positioned in the rightwardmost or leftwardmost positions for engaging either gear 76 or gear 74, respectively, to the mainshaft 46. Splitter jaw clutch 80 is axially positioned by means of a shift fork 84 controlled by a two-position piston actuator 86 which is operable by a driver selection switch such as a button or the like on the shift knob (not shown) as is known in the prior art. Two-position synchronized clutch assembly 82 is also a two-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a two-position piston device 90, the actuation and control of which will be described in greater detail below.

Figure 2:
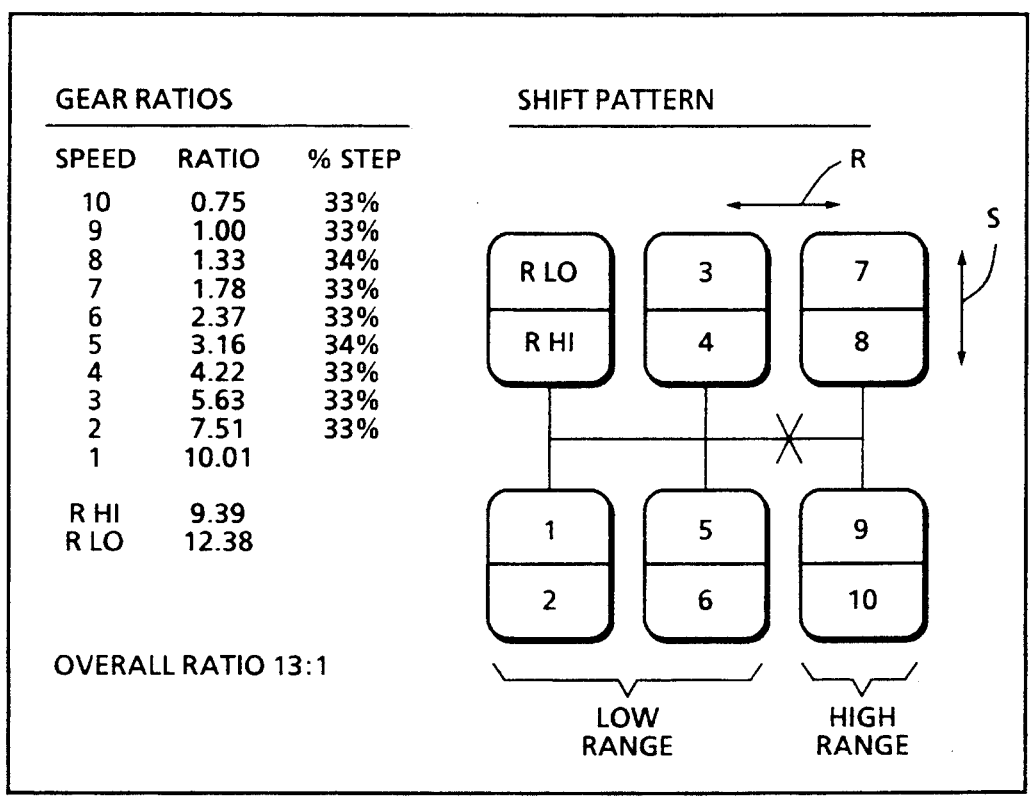
FIG. 2 is a schematic illustration of the shift pattern and typical ratio steps for the transmission of FIG. 1.
Figure 5:
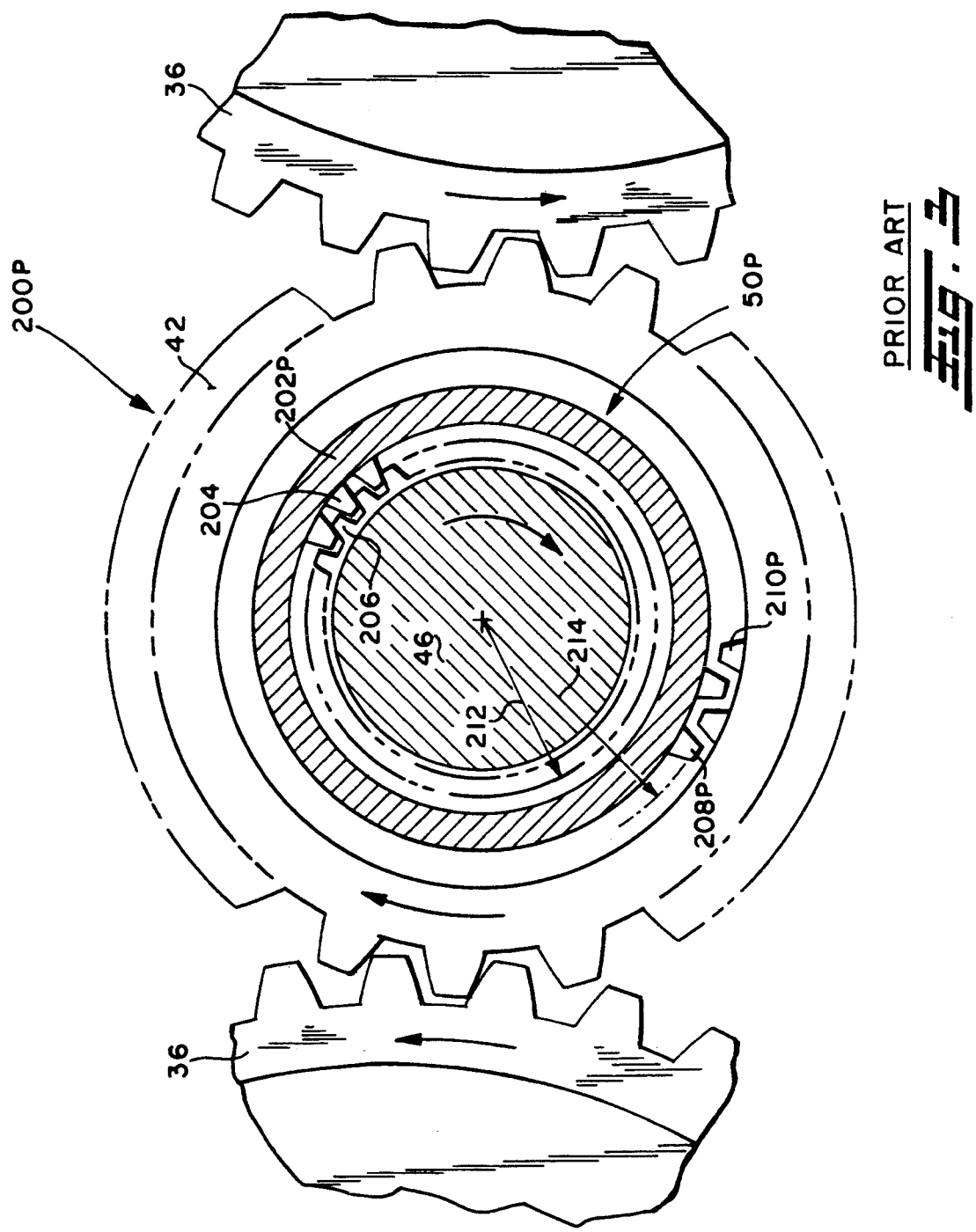

As may be seen by reference to FIGS. 1-2, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a three layer auxiliary section of the combined range and splitter type providing four selectable speeds or drive ratios between the input (mainshaft 46) and output (output shaft 58) thereof. The mainsection 12 provides a reverse and three potentially selectable forward speeds. However, one of the selectable mainsection forward gear ratios, the low speed gear ratios associated with mainshaft gear 42, is not utilized in the high range. Thus, transmission 10 is properly designated as a "$(2+1) \times (2 \times 2)$" type transmission providing nine or ten selectable forward speeds, depending upon the desirability and practicality of splitting the low gear ratio.

While clutch 82, the range clutch, should be a synchronized clutch, double acting clutch collar 80, the splitter clutch, is not required to be synchronized. The shift pattern for shifting transmission 10 is schematically illustrated in FIG. 2. Divisions in the vertical direction at each gear lever position signify splitter shifts while movement in the horizontal direction from the three/four and five/six leg of the H pattern to the seven/eight and nine/ten leg of the H pattern signifies a shift from the low range to the high range of the transmission. As discussed above, splitter shifting is accomplished in the usual manner by means of a vehicle operator actuated splitter button or the like, usually a button located at the shift lever knob while operation of the range clutch shifting assembly is an automatic response to movement of the gear shift lever between the central and rightwardmost legs of the shift pattern as illustrated in FIG. 2 and will be described in greater detail below. Range shift devices of this general type are known in the prior art and may be seen by reference to above-mentioned U.S. Pat. Nos. 3,429,202; 4,455,883; 4,561,325 and 4,663,725, the disclosures of which are incorporated herein by reference.

Referring again to FIG. 2, and assuming that it is desirable that a transmission have generally equal ratio steps, the mainsection ratio steps should be generally equal, the splitter step should be generally equal to the square root of the mainsection ratio steps and the range step should equal about the mainsection ratio step raised to the N power where N equals the number of mainsection ratio steps occurring in both ranges (i.e., N=2 in the $(2+1) \times (2 \times 2)$ transmission 10). Given the desired ideal ratios, gearing to approximate these ratios is selected. In the above example, the splitter steps are about 33.3% while the range step is about 316% which is generally suitable for a "2+1" main transmission section having about 78% steps as the square root of 1.78 equals about 1.33 and 1.78 raised to the second power (i.e. N equals 2) equals about 3.16.

Shift control unit or assembly for controlling shifting of the main transmission section 12 and the range portion, clutch 82, of the auxiliary section 14 of transmission 10 is defined by the shift bar housing assembly 56 of tile type defined in above-mentioned U.S. Pat. No. 5,000,060.

Figure 4A:
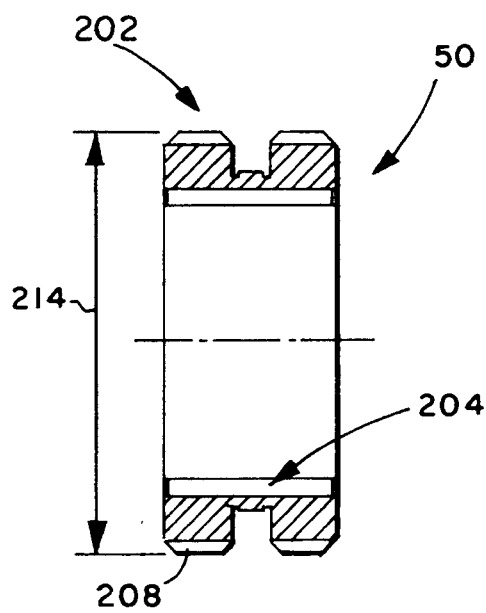
FIGS. 4A and 4B are front and side views of the clutch collar of FIG. 4.
Figure 4B:
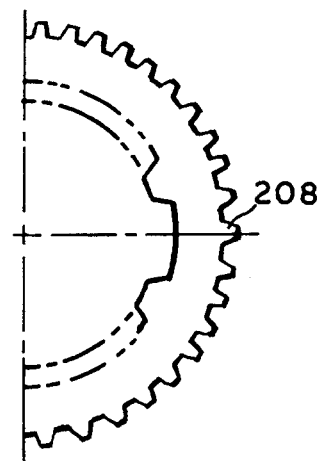
Figure 4:
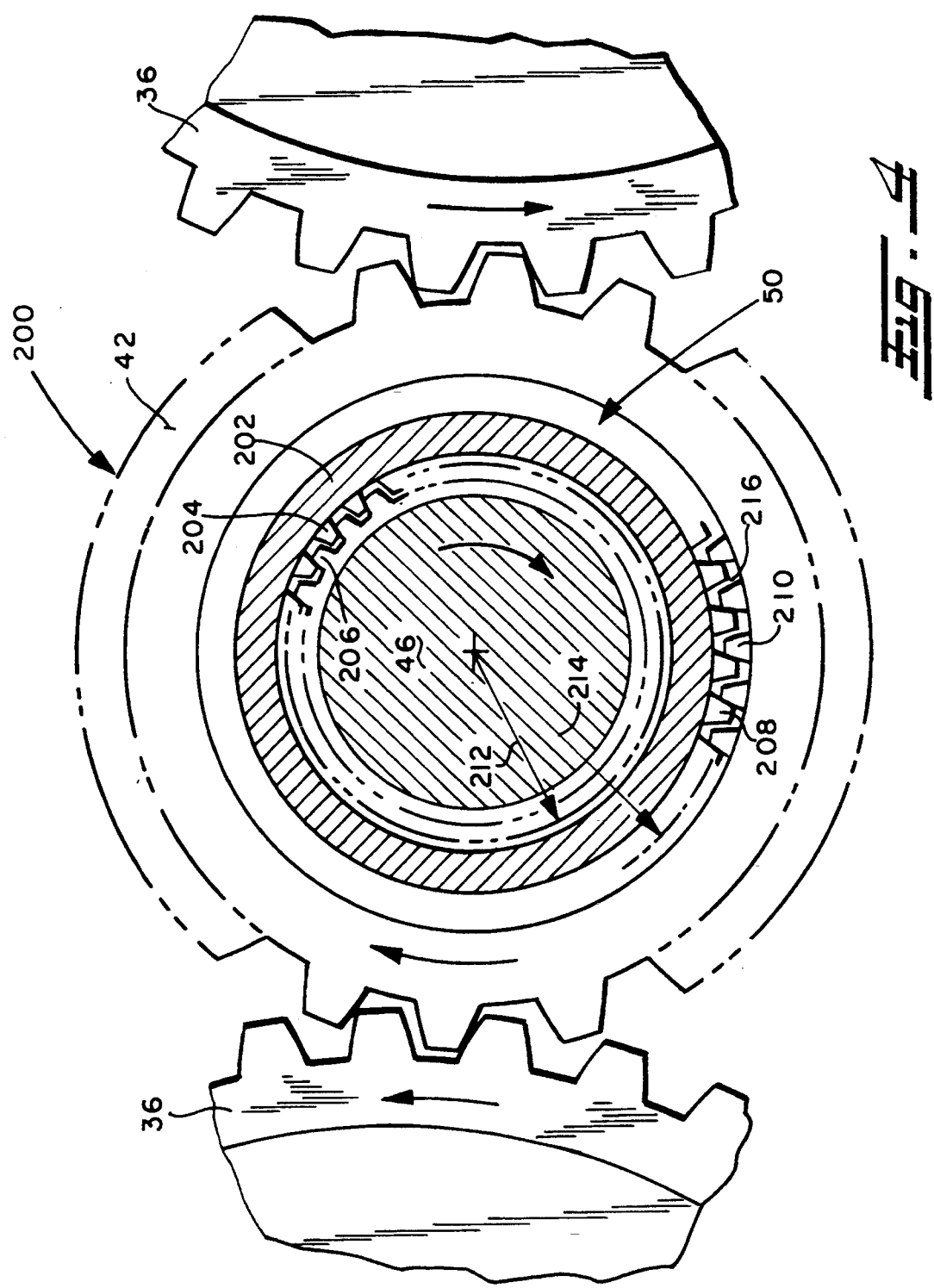
FIG. 4 is an enlarged sectional view, similar to FIG. 3 and taken along line 4—4 in FIG. 1 of the positive clutch system of the present invention.

The details of the nonsynchronized positive clutch structure 200 of the present invention are illustrated in FIG. 4. Positive clutch system 200 is effective to selectively rotationally couple and decouple a first rotatable member, such as mainshaft 16, to and from a second rotatable member, such as mainshaft gear 42. Mainshaft gear 42, as described above, is constantly meshed with at least one countershaft gear 36.

Figure 3A:
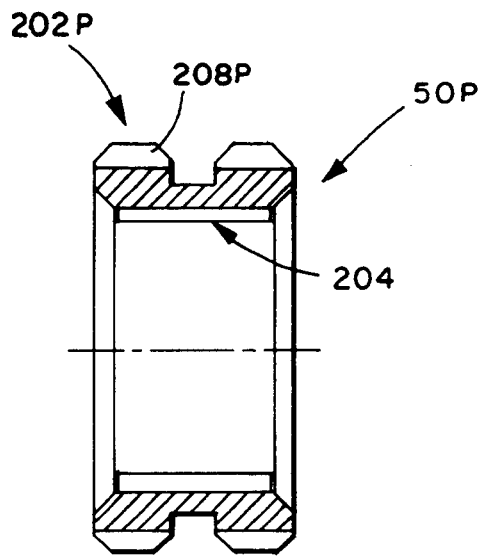
FIGS. 3A and 3B are front and side views of the clutch collar of FIG. 3.
Figure 3B:
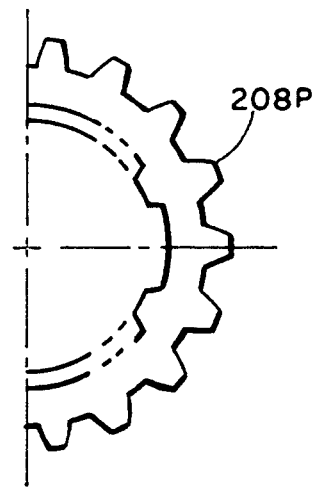

The structural details of the prior art clutch structure 200P are illustrated in FIG. 3 wherein members or elements substantially structurally and functionally identical to members or elements of the present invention are given like reference numbers. Elements of clutch system 200P having a similar function, but different structure then elements of system 200 are assigned like reference numerals with a letter "P" appended thereto.

The positive clutch system 200 of the present invention includes the leftward or forward end 202 of double acting clutch collar 50. The clutch collar 50 is provided with internal spline teeth 204 which cooperate with external spline teeth 206 provided on mainshaft 46 to mount the clutch collar 50 to the mainshaft for rotation therewith and axially sliding movement relative thereto. The forward end 102 of clutch collar 50 is provided with an annular array of external positive clutch teeth 208 for selective positive engagement with internal clutch teeth 210 formed integrally with hub 42A of mainshaft gear 42.

Portion 202 of clutch collar 50 which carries the external clutch teeth 208 and is rotationally fixed to mainshaft 46 may be considered a first clutch member and the hub portion of gear 42 which carries the internal clutch teeth 210 may be considered the second clutch member of a positive clutch for selectively rotationally coupling and decoupling mainshaft gear 42 from mainshaft 46.

As is described in greater detail in above-mentioned U.S. Pat. No. 3,265,173, the leading edges of the clutch teeth 208 and 210 are inclined relative to the rotational axis of mainshaft 46, preferably about 35° relative to the rotational axis of mainshaft 46, whereby, at initiation of a clutch engagement operation if the relative rotation between clutch members 202 and 46 exceeds a predetermined limit, the leading edges of the clutch teeth will cause the clutch members to ratchet or skate rather than go into engagement to prevent unacceptably harsh shifting and/or damage to the clutch members. The maximum value of relative rotation between the engaging clutch members, i.e. the maximum amount of asynchronous rotation under which the clutch members will engage, is determined by the total effective backlash, or rotational freeplay, of the positive clutch system and the magnitude of the axial engagement force.

In positive clutch systems 200 and 200P, total system backlash is the sum of the backlash provided by the spline connection between the clutch collar 50 and mainshaft 46 and the backlash between the clutch teeth 208 and 210 of the clutch collar and gear, respectively, to be engaged. In a typical prior an transmission of the type wherein the pitch diameter 212 of the spline connection between the mainshaft and the clutch collar equals about 2.10 inches and the pitch diameter 214 of the interengagable clutch teeth 208 and 210 equals about 3.00 inches, the total backlash in the clutch system might be selected to be 0.024 inches (1.11° of rotation) of which 0.012 inches (0.65° of rotation) would be provided at the splined tooth connection between the mainshaft and sliding clutch collar and 0.012 inches (0.46° of rotation) would be provided at the clutch teeth 208 and 210.

The clutch structure 200 of the present invention utilizes about thirty-nine or forty of each clutch teeth 208 and clutch teeth 210, while maintaining substantially identical pitch radius 214 and clutch tooth backlash as prior art clutch structure 200P which typically utilizes about eighteen to twenty (18 to 20) clutch teeth 208P and clutch teeth 210P.

The number of clutch teeth 208 and 210 utilized in the nonsynchronized positive clutch structure 200 of the present invention is determined as a function of pitch radius 214 and desired backlash 216, both of which are substantially fixed, in a given transmission structure, and durability considerations. Based upon these considerations, a maximum or near maximum allowable number of clutch teeth is selected. This differs considerably from the prior an clutches having a relatively high number of clutch teeth where the number was generally proportional to a relatively larger pitch diameter. For example, typical prior art nonsynchronized clutches have a pitch diameter of about three inches and 18–20 clutch teeth or a pitch of about 6 or 7 while the abovementioned T-11607 transmissions use some nonsynchronized clutches having a pitch diameter of about 3.73 inches and 30 clutch teeth or a pitch of about 8. In sharp contrast, the clutch of the present invention has a pitch of about 13 (39 teeth and about a three inch pitch diameter).

Pitch, as used herein and in the transmission industry, being the number of clutch teeth divided by the pitch diameter (in units of inches).

The present invention involves a nonsynchronized positive clutch for heavy duty transmissions (pitch diameter greater than 2.5 inches) having a pitch P equal to at least 125%, preferably at least 150%, of the pitch (6 to 8) utilized in the prior art for similar clutches of equal pitch radius. Clutches provided according to the present invention will have a number of clutch teeth N wherein $$N \geq P*PD$$

where:
N equals the number of clutch teeth on each clutch member,
P equals at least 10, and
PD equals the pitch diameter expressed in units of inches.

The reason that the clutch structure of the present invention tends to provide smoother, less harsh shifting is believed to be that truck drivers apply an amount of force, via the shift levers, which will provide the most acceptable combination of less harsh, i.e. closer to synchronized, shifting and minimized chance for missed shifts. As is well known, for a given nonsynchronized positive clutch structure, 200 or 200P, applying a greater force will minimize the chances of a missed shift but increase the chances of harsh shifting as the difference in rotational speeds at which the clutch members will engage rather than ratchet as the clutch members pass through synchronous is increased with increasing axial application force. As the clutch members pass through synchronous, often with a relative acceleration of about 1000 RPM/sec, the use of more clutch teeth (assuming a given clutch system backlash) means that more opportunities for clutch engagement (i.e. tooth and tooth space alignment) are presented closer to true synchronous, minimizing the risk of missed shifts and allowing the use of lower force which will result in smoother shifts. As heavy duty vehicle operators learn that lower force may be used without risking missed shifts, they will tend to use such a lower force and smoother, less harsh shifting will result.

Accordingly, it may be seen that, compared to the prior art, by utilizing the nonsynchronized positive clutch structure for heavy duty mechanical vehicular transmissions according to the present invention, the smoothness of gear changing clutch engagement may be increased without increasing the risk of missed shifts, the risk of missed shifts may be decreased without increasing the harshness of shifts, and/or a desirable combination thereof, is provided.

Although the present invention has been described in its preferred form with a certain degree of particularity, it is understood that the present disclosure of the preferred form has been made only by way of example and that numerous changes in the details of construction and combination and arrangement of the parts may be resorted to without departing from the spirit and the scope of the invention as here and after claimed.

I claim:

1. A nonsynchronized positive clutch system (200) for selectively rotationally coupling and decoupling first (46) and second (42) independently rotatable members, said clutch system comprising a first clutch member (50) rotatable with said first rotatable member (46) and a second clutch member (42A) rotatable with said second rotatable member (42), said first and second clutch members carrying an array of first (208) and second (210) interengagable clutch teeth, respectively, said clutch teeth defining a pitch diameter (214), said clutch system characterized by:

the number of clutch teeth (N) carried by each of said clutch members defined by the expression;

$$N \geq P*PD$$

where:
N = the number of interengagable clutch teeth on each of said clutch members,
P = clutch pitch $\geq$ 10; and
PD = the pitch diameter (214) expressed in units of inches.

2. The system of claim 1 wherein P is greater than or equal to 12.

3. The system of claim 1 wherein PD is equal to at least 2.5 inches.

4. The system of claim 1 wherein PD is equal to at least 3.0 inches.

5. The system of claim 2 wherein PD is equal to at least 2.5 inches.

6. The system of claim 5 wherein PD is equal to at least 3.0 inches.

7. A vehicular heavy-duty mechanical transmission (10) including a non-synchronized positive jaw clutch assembly (200) for selectively rotationally coupling and decoupling a transmission shaft (46) to a transmission gear (42) surrounding said shaft and independently rotatable relative thereto, said clutch assembly comprising a clutch sleeve (50) coupled to said shaft for rotation therewith and axial movement relative thereto and a hub member (42A) rotatably coupled to said gear (42), said clutch sleeve and said hub member carrying an array of first (208) and second (210) axially interengagable clutch teeth, respectively, said clutch teeth defining a pitch diameter (214) of at least 2.5 inches, said transmission characterized by said clutch assembly being defined by:

$$N \geq P*PD$$

where:
- N = the number of interengagable clutch teeth on each of said clutch members,
- P = clutch pitch $\geq$ 10; and
- PD = the pitch diameter (214) expressed in units of inches.

8. The transmission of claim 7 wherein P is greater than or equal to 12.

9. The transmission of claim 7 wherein PD is equal to at least 3.0 inches.

10. The transmission of claim 8 wherein PD is equal to at least 3.0 inches.

11. The transmission of claim 7 wherein said clutch teeth define a backlash of about 0.012 inches at the pitch diameter.

12. The transmission of claim 8 wherein said clutch teeth define a backlash of about 0.012 inches at the pitch diameter.

13. The transmission of claim 9 wherein said clutch teeth define a backlash of about 0.012 inches at the pitch diameter.

14. The transmission of claim 7 wherein said first clutch teeth extend radially outwardly from said clutch sleeve and said second clutch teeth (210) extend radially inwardly from said hub member.

15. The transmission of claim 8 wherein said first clutch teeth extend radially outwardly from said clutch sleeve and said second clutch teeth (210) extend radially inwardly from said hub member.

16. The transmission of claim 9 wherein said first clutch teeth extend radially outwardly from said clutch sleeve and said second clutch teeth (210) extend radially inwardly from said hub member.

17. The transmission of claim 11 wherein said first clutch teeth extend radially outwardly from said clutch sleeve and said second clutch teeth (210) extend radially inwardly from said hub member.

18. The transmission of claim 12 wherein said first clutch teeth extend radially outwardly from said clutch sleeve and said second clutch teeth (210) extend radially inwardly from said hub member.

* * * * *